US011884822B2

(12) United States Patent
Vandormael et al.

(10) Patent No.: US 11,884,822 B2
(45) Date of Patent: Jan. 30, 2024

(54) LOW TEMPERATURE FOAMABLE POLYCARBONATE COMPOSITION AND ARTICLES THEREOF

(71) Applicant: SHPP Global Technologies B.V., Bergen op Zoom (NL)

(72) Inventors: Bart Vandormael, Bergen op Zoom (NL); Arno C. Hagenaars, Bergen op Zoom (NL); Johannes Gerardus Petrus Goossens, Bergen op Zoom (NL); Johannes De Brouwer, Bergen op Zoom (NL); Pieter Jan Antoon Janssen, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 281 days.

(21) Appl. No.: 17/007,644

(22) Filed: Aug. 31, 2020

(65) Prior Publication Data

US 2021/0095127 A1 Apr. 1, 2021

(30) Foreign Application Priority Data

Sep. 30, 2019 (EP) .................................... 19200434

(51) Int. Cl.
*C08J 9/00* (2006.01)
*C08L 69/00* (2006.01)
*C08L 67/02* (2006.01)
*C08L 83/10* (2006.01)
*C08G 64/16* (2006.01)
*C08G 64/18* (2006.01)

(52) U.S. Cl.
CPC .......... *C08L 83/10* (2013.01); *C08G 64/1608* (2013.01); *C08G 64/186* (2013.01); *C08J 9/0061* (2013.01); *C08L 67/02* (2013.01); *C08L 69/00* (2013.01); *C08L 69/005* (2013.01); *C08J 2369/00* (2013.01); *C08J 2383/10* (2013.01); *C08J 2467/02* (2013.01); *C08L 2203/14* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 4,616,042 A | 10/1986 | Avakian | |
| 4,767,818 A * | 8/1988 | Boutni | ..................... C08L 69/00 524/505 |
| 4,983,706 A * | 1/1991 | Fontana | ................. C08G 63/64 528/196 |
| 7,838,108 B2 | 11/2010 | Thiagarajan et al. | |
| 7,842,379 B2 | 11/2010 | Thiagarajan et al. | |
| 8,283,390 B2 | 10/2012 | Thiagarajan et al. | |
| 2006/0135690 A1 * | 6/2006 | Juikar | ..................... C08L 69/00 525/67 |
| 2011/0060067 A1 | 3/2011 | Thiagarajan et al. | |
| 2013/0309474 A1 | 11/2013 | Peek et al. | |
| 2014/0179843 A1 * | 6/2014 | van der Mee | ........ C08L 51/085 525/461 |
| 2015/0368464 A1 * | 12/2015 | Wang | ..................... C08G 63/64 524/539 |
| 2016/0340507 A1 | 11/2016 | Ding et al. | |
| 2019/0048185 A1 | 2/2019 | Ding et al. | |

FOREIGN PATENT DOCUMENTS

| | | |
|---|---|---|
| EP | 0524731 A1 | 1/1993 |
| EP | 3670586 A1 | 6/2020 |
| WO | 2015188084 A1 | 12/2015 |

OTHER PUBLICATIONS

Li, Ruosong et al.; "Glass Transition Temperature in Microcellular Foaming Process with Supercritical Carbon Dioxide: A Review"; Polymer-Plastics Technology and Engineering, vol. 54, Issue 2, 1982, Abstract only.

* cited by examiner

*Primary Examiner* — David J Buttner
(74) *Attorney, Agent, or Firm* — CANTOR COLBURN LLP

(57) ABSTRACT

A foamable poly carbonate composition comprising 5 to 95 wt % of a poly(siloxane) block copolymer comprising a poly(carbonate-siloxane) comprising 50 to 99 wt % of bisphenol A carbonate units and 1 to 50 wt % of dimethyl-siloxane units, each based on the weight of the poly(carbonate-siloxane), a poly(ester-carbonate-siloxane) comprising bisphenol A carbonate units, isophthalate-terephthalate-bisphenol A ester units, and 5 to 200 dimethyl siloxane units, or a combination thereof; 5 to 95 wt % of an auxiliary component comprising a poly(alkylene ester), a poly(ester-carbonate), or a combination thereof, and optionally, a homopolycarbonate; optionally, up to 10 wt % of an additive composition, wherein the composition has a glass transition temperature of 140° C. and below measured using differential scanning calorimetry, and wherein a foamed sample of the composition has an average cell size of 10 nanometers to 20 micrometers.

16 Claims, No Drawings

LOW TEMPERATURE FOAMABLE POLYCARBONATE COMPOSITION AND ARTICLES THEREOF

CROSS-REFERENCE TO RELATED APPLICATION

This application claims priority to EP Application No. 19200434.9, filed on Sep. 30, 2019, the content of which is herein incorporated by reference in its entirety.

BACKGROUND

This disclosure relates to polycarbonate compositions, and in particular to foamable polycarbonate compositions, methods of manufacture, and uses thereof.

Polycarbonates are useful in the manufacture of articles and components for a wide range of applications, from automotive parts to electronic appliances. Because of their broad use, particularly in building and aircraft insulation, it is desirable to provide foamable polycarbonate compositions with improved heat resistance.

There accordingly remains a need in the art for foamable polycarbonate compositions that have improved heat resistance. It would be a further advantage if the glass transition temperature of the foamable polycarbonate composition was 140° C. or below.

SUMMARY

The above-described and other deficiencies of the art are met by a foamable polycarbonate composition comprising: 5 to 95 wt % of a poly(siloxane) block copolymer comprising a poly(carbonate-siloxane) comprising 50 to 99 wt % of bisphenol A carbonate units and 1 to 50 wt % of dimethylsiloxane units, each based on the weight of the poly(carbonate-siloxane), a poly(ester-carbonate-siloxane) comprising bisphenol A carbonate units, isophthalate-terephthalate-bisphenol A ester units, and 5 to 200 dimethyl siloxane units, or a combination thereof; 5 to 95 wt % of an auxiliary component comprising a poly(alkylene ester), a poly(ester-carbonate), or a combination thereof, and optionally, a homopolycarbonate; optionally, up to 10 wt % of an additive composition, wherein the composition has a glass transition temperature of 140° C. and below measured using differential scanning calorimetry, and wherein a foamed sample of the composition has an average cell size of 10 nanometers to 20 micrometers.

In another aspect, a method of manufacture comprises combining the above-described components to form a foamable polycarbonate composition.

In yet another aspect, an article comprises the above-described a foamable polycarbonate composition.

In still another aspect, a method of manufacture of an article comprises molding, extruding, or shaping the above-described a foamable polycarbonate composition into an article.

The above described and other features are exemplified by the following drawings, detailed description, examples, and claims.

DETAILED DESCRIPTION

There is a need for polycarbonate foams with improved insulation properties that can be processed at conventional temperatures. Applications of polycarbonate foams with improved insulation properties include thermal insulation in buildings, in particular, historical or higher end buildings in which space for insulation is scarce and non-flexible. In aircrafts, polycarbonate foams could provide a light-weight solution for insulation against heat and noise. Polycarbonate foams with a small cell size may also give diffusive light effects which can be used in overhead lighting elements.

Conventional poly(carbonate-siloxane)s have advantageous foaming properties due to the fact that the dimethylsiloxane blocks form numerous, well-dispersed domains which absorb super-critical carbon dioxide ($scCO_2$) easily and cause a large number of cells to be formed in the foaming process step. Such cells are desirably smaller in size resulting in a foam with improved properties over a standard homopolycarbonate foam. In particular, foamed poly(carbonate-siloxane)s provide improved thermal or acoustic insulation properties vs. a larger cell size homopolycarbonate foam and can provide improved translucency. However, poly(carbonate-siloxane)s have glass transition temperatures above 150° C., thus requiring specially designed production lines, while conventional production lines were designed for materials such as polystyrene to operate in the 110 to 140° C. range. Therefore, it would be advantageous to develop a foam formulation that has the foam processing and property benefits of poly(carbonate-siloxane)s, but that can be processed at 110 to 140° C. under conventional processing conditions.

The inventors hereof have discovered foamable polycarbonate compositions including a poly(siloxane) block copolymer and an auxiliary component including an auxiliary component, wherein the composition has glass transition temperature of 140° C. or below as determined according to differential scanning calorimetry to provide a foamable polycarbonate composition that can be processed using conventional equipment at lower temperatures. A foamed sample of the foamable polycarbonate composition can have an average cell size of 5 nanometers (nm) to 20 micrometers (μm), or 5 nm to 10 μm, or 5 nm to 5 μm, or 5 nm to 1000 nm, or 5 nm to 800 nm, or 5 nm to 600 nm, or 5 nm to 400 nm, or 5 to 200 nm, or 5 nm to 100 nm.

The foamable polycarbonate compositions include a poly(siloxane) block copolymer and an auxiliary component comprising a poly(alkylene ester), a poly(ester-carbonate), or a combination thereof, and optionally, a homopolycarbonate. The individual components are described in further detail below.

"Polycarbonate" as used herein means a polymer having repeating structural carbonate units of formula (1)

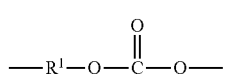

(1)

in which at least 60 percent of the total number of $R^1$ groups contain aromatic moieties and the balance thereof are aliphatic, alicyclic, or aromatic. In an aspect, each $R^1$ is a $C_{6-30}$ aromatic group, that is, contains at least one aromatic moiety. $R^1$ can be derived from an aromatic dihydroxy compound of the formula $HO-R^1-OH$, in particular of formula (2)

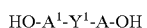

(2)

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Preferably, each $R^1$ can be derived from a bisphenol of formula (3)

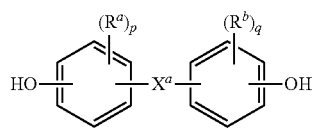
(3)

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group. In an aspect, the bridging group $X^a$ is single bond, —O—, —S—, —S(O)—, —S(O)$_2$—, —C(O)—, or a $C_{1-60}$ organic group. The organic bridging group can be cyclic or acyclic, aromatic or non-aromatic, and can further comprise heteroatoms such as halogens, oxygen, nitrogen, sulfur, silicon, or phosphorous. The $C_{1-60}$ organic group can be disposed such that the $C_6$ arylene groups connected thereto are each connected to a common alkylidene carbon or to different carbons of the $C_{1-60}$ organic bridging group. In an aspect, p and q is each 1, and $R^a$ and $R^b$ are each a $C_{1-3}$ alkyl group, preferably methyl, disposed meta to the hydroxy group on each arylene group.

In an aspect, $X^a$ is a $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of these types include methylene, cyclohexylmethylidene, ethylidene, neopentylidene, and isopropylidene, as well as 2-[2.2.1]-bicycloheptylidene, cyclohexylidene, 3,3-dimethyl-5-methylcyclohexylidene, cyclopentylidene, cyclododecylidene, and adamantylidene.

In another aspect, $X^a$ is a $C_{1-18}$ alkylene, a $C_{3-18}$ cycloalkylene, a fused $C_{6-18}$ cycloalkylene, or a group of the formula -$J^1$-G-$J^2$- wherein $J^1$ and $J^2$ are the same or different $C_{1-6}$ alkylene and G is a $C_{3-12}$ cycloalkylidene or a $C_{6-16}$ arylene.

For example, $X^a$ can be a substituted $C_{3-18}$ cycloalkylidene of formula (4)

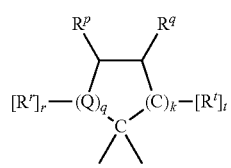
(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and q is 0, the ring as shown in formula (4) contains 4 carbon atoms, when k is 2, the ring as shown in formula (4) contains 5 carbon atoms, and when k is 3, the ring contains 6 carbon atoms. In an aspect, two adjacent groups (e.g., $R^q$ and $R^t$ taken together) form an aromatic group, and in another aspect, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone, or Q can be —N(Z)— wherein Z is phenyl.

Bisphenols wherein $X^a$ is a cycloalkylidene of formula (4) can be used in the manufacture of poly carbonates containing phthalimidine carbonate units of formula (1a)

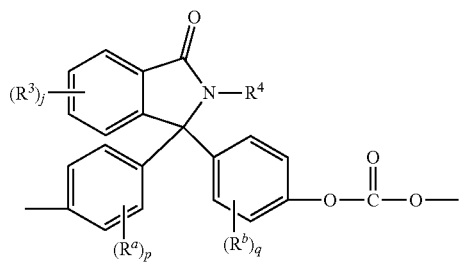
(1a)

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (1b)

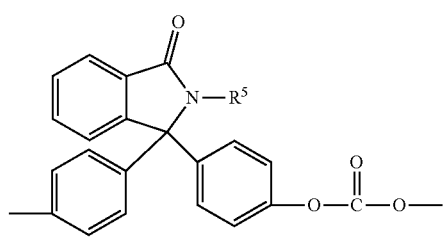
(1b)

wherein $R^5$ is hydrogen, phenyl optionally substituted with up to five 5 $C_{1-6}$ alkyls, or $C_{1-4}$ alkyl. In an aspect in formula (1b), $R^5$ is hydrogen, methyl, or phenyl, preferably phenyl. Carbonate units (1b) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

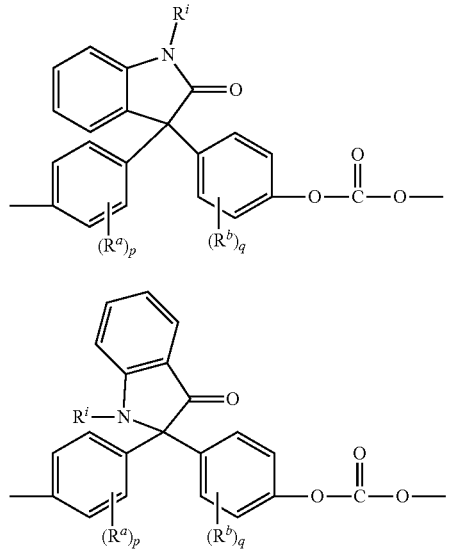

wherein $R^a$ and $R^b$ are each independently a halogen, $C_{1-12}$ alkoxy, or $C_{1-12}$ alkyl, p and q are each independently 0 to 4, and $R^1$ is $C_{1-12}$ alkyl, phenyl optionally substituted with 1 to 5 $C_{1-10}$ alkyl, or benzyl optionally substituted with 1 to 5 $C_{1-10}$ alkyl. In an aspect, $R^a$ and $R^b$ are each methyl, p and q are each independently 0 or 1, and $R^1$ is $C_{1-4}$ alkyl or phenyl.

Other examples of bisphenol carbonate units derived from of bisphenols (3) wherein $X^a$ is a substituted or unsubstituted $C_{3-18}$ cycloalkylidene include the cyclohexylidene-bridged bisphenol of formula (1e)

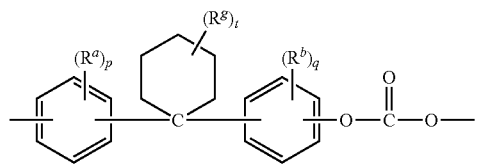

wherein $R^a$ and $R^b$ are each independently $C_{1-12}$ alkyl, $R^g$ is $C_{1-12}$ alkyl, p and q are each independently 0 to 4, and t is 0 to 10. In a specific aspect, at least one of each of $R^a$ and $R^b$ are disposed meta to the cyclohexylidene bridging group. In an aspect, $R^a$ and $R^b$ are each independently $C_{1-4}$ alkyl, $R^g$ is $C_{1-4}$ alkyl, p and q are each 0 or 1, and t is 0 to 5. In another specific aspect, $R^a$, $R^b$, and $R^g$ are each methyl, p and q are each 0 or 1, and t is 0 or 3, preferably 0. In still another aspect, p and q are each 0, each $R^g$ is methyl, and t is 3, such that $X^a$ is 3,3-dimethyl-5-methyl cyclohexylidene.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

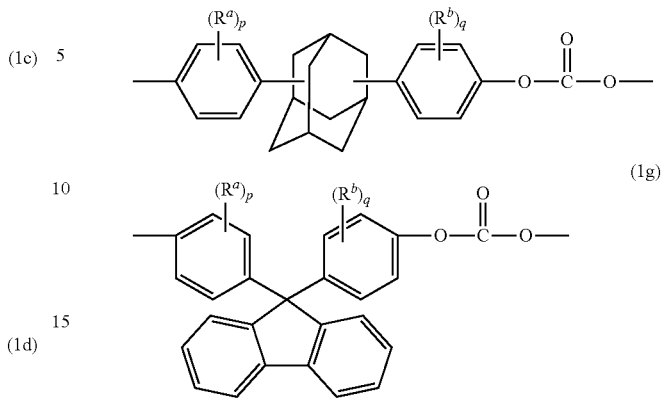

wherein $R^a$ and $R^b$ are each independently $C_{1-12}$ alkyl, and p and q are each independently 1 to 4. In a specific aspect, at least one of each of $R^a$ and $R^b$ are disposed meta to the cycloalkylidene bridging group. In an aspect, $R^a$ and $R^b$ are each independently $C_{1-3}$ alkyl, and p and q are each 0 or 1; preferably, $R^a$, $R^b$ are each methyl, p and q are each 0 or 1, and when p and q are 1, the methyl group is disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

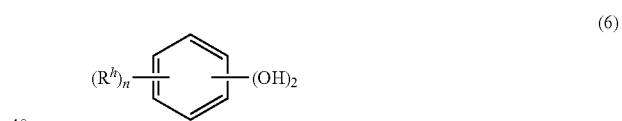

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or a combination thereof.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). A combination can also be used. In a specific aspect, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of 0.3 to 1.5 deciliters per gram (dl/gm), preferably 0.45 to 1.0 dl/gm. The polycarbonates can have a weight average molecular weight (Mw) of 15,000 to 40,000 grams per mole (g/mol), as measured by gel permeation chromatography (GPC), using a crosslinked styrene-divinylbenzene column and calibrated to bisphenol A homopolycarbonate references. GPC samples are prepared at a concentration of 1 mg per ml and are eluted at a flow rate of 1.5 ml per minute. In an aspect, a bisphenol A homopolycarbonate can be used having a weight average molecular weight from 18,000-35,000 g/mol, preferably 20,000-25,000 g/mol; a having a weight average molecular weight from 25,000-35,000 g/mol, preferably 27,000-32,000 g/mol; or a combination thereof, each as measured via gel permeation chromatography using bisphenol A homopolycarbonate standards.

The term "polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units.

The auxiliary component can include a poly(ester-carbonate), also known as a polyester-polycarbonate. Such copolymers further contain, in addition to recurring carbonate units of formula (1), repeating units of formula (7)

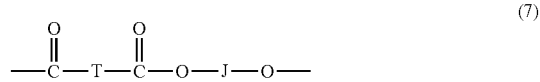

wherein J is a divalent group derived from a dihydroxy compound (including a reactive derivative thereof), and can be, for example, a $C_{1-10}$ alkylene, a $C_{6-20}$ cycloalkylene, a $C_{5-20}$ arylene, or a polyoxyalkylene in which the alkylene groups contain 2 to 6 carbon atoms, preferably 2, 3, or 4 carbon atoms; and T is a divalent group derived from a dicarboxylic acid (including a reactive derivative thereof), and can be, for example, a $C_{2-20}$ alkylene, a $C_{5-20}$ cycloalkylene, or a $C_{6-20}$ arylene. Copolyesters containing a combination of different T or J groups can be used. The polyester units can be branched or linear.

In an aspect, J is a $C_{2-30}$ alkylene group having a straight chain, branched chain, or cyclic (including polycyclic) structure, for example ethylene, n-propylene, i-propylene, 1,4-butylene, 1,4-cyclohexylene, or 1,4-methylenecyclohexane. In another aspect, J is derived from a bisphenol of formula (3), e.g., bisphenol A. In another aspect, J is derived from an aromatic dihydroxy compound of formula (6), e.g, resorcinol.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination thereof. A specific dicarboxylic acid comprises a combination of isophthalic acid and terephthalic acid wherein the weight ratio of isophthalic acid to terephthalic acid is 91:9 to 2:98.

Specific ester units include ethylene terephthalate, n-propylene terephthalate, n-butylene terephthalate, 1,4-cyclohexanedimethylene terephthalate, and ester units derived from isophthalic acid, terephthalic acid, and resorcinol (ITR)). The molar ratio of ester units to carbonate units in the copolymers can vary broadly, for example 1:99 to 99:1, preferably 10:90 to 90:10, more preferably 25:75 to 75:25, or 2:98 to 15:85, depending on the desired properties of the final composition. Specific poly(ester-carbonate)s are those including bisphenol A carbonate units and isophthalate-terephthalate-bisphenol A ester units, also commonly referred to as poly(carbonate-ester)s (PCE) poly(phthalate-carbonate)s (PPC) depending on the molar ratio of carbonate units and ester units.

In a specific aspect, the polycarbonate copolymer is a poly(bisphenol A carbonate)-co-(bisphenol A-phthalate-ester) of formula (8a)

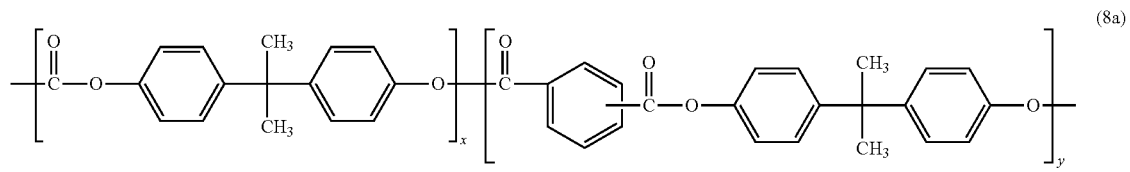

(8a)

wherein y and x represent the wt % of arylate-bisphenol A ester units and bisphenol A carbonate units, respectively. Generally, the units are present as blocks. In an aspect, the wt % of ester units y to carbonate units x in the copolymers is 50:50 to 99:1, or 55:45 to 90:10, or 75:25 to 95:5. Copolymers of formula (8a) comprising 35 to 45 wt % of carbonate units and 55 to 65 wt % of ester units, wherein the ester units have a molar ratio of isophthalate to terephthalate of 45:55 to 55:45 are often referred to as poly(carbonate-ester)s (PCE). Copolymers comprising 15 to 25 wt % of carbonate units and 75 to 85 wt % of ester units having a molar ratio of isophthalate to terephthalate from 98:2 to 88:12 are often referred to as poly(phthalate-carbonate)s (PPC).

In another aspect, a specific polycarbonate copolymer is a poly(carbonate-co-monoarylate ester) that includes carbonate units (1) and repeating monoarylate ester units of formula (7b)

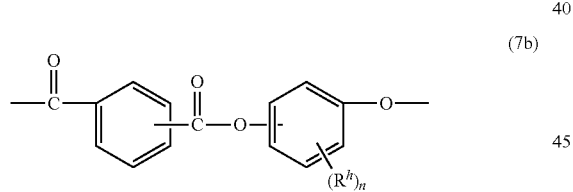

(7b)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Preferably, each $R^h$ is independently a $C_{1-4}$ alkyl, and n is 0 to 3, 0 to 1, or 0. These poly(carbonate-co-monoarylate ester)s include units of formula (8b)

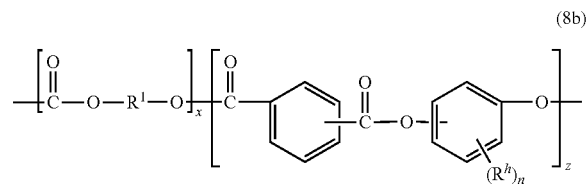

(8b)

wherein $R^1$ is as defined in formula (1) and $R^h$ and n are as defined in formula (7b), and the mole ratio of carbonate units x to ester units z is from 99:1 to 1:99, or from 98:2 to 2:98, or from 90:10 to 10:90. In an aspect the mole ratio of x:z is from 50:50 to 99:1, or from 1:99 to 50:50.

Preferably, the monoarylate ester unit (7b) is derived from the reaction of a combination of isophthalic and terephthalic diacids (or a reactive derivative thereof) with resorcinol (or a reactive derivative thereof) to provide isophthalate/terephthalate-resorcinol ("ITR" ester units) of formula (7c).

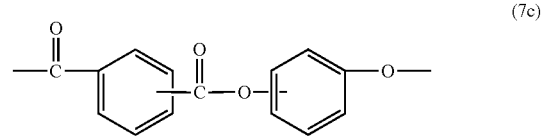

(7c)

In an aspect, the ITR ester units are present in the polycarbonate copolymer in an amount greater than or equal to 95 mol %, preferably greater than or equal to 99 mol %, and still more preferably greater than or equal to 99.5 mol %, based on the total moles of ester units in the copolymer. Such (isophthalate/terephthalate-resorcinol)-carbonate copolymers ("ITR-PC") can possess many desired features, including toughness, transparency, and weatherability. ITR-PC copolymers can also have desirable thermal flow properties. In addition, ITR-PC copolymers can be readily manufactured on a commercial scale using interfacial polymerization techniques, which allow synthetic flexibility and composition specificity in the synthesis of the ITR-PC copolymers.

A specific example of a poly(carbonate-co-monoarylate ester) is a poly(bisphenol A carbonate-co-isophthalate-terephthalate-resorcinol ester) of formula (8c)

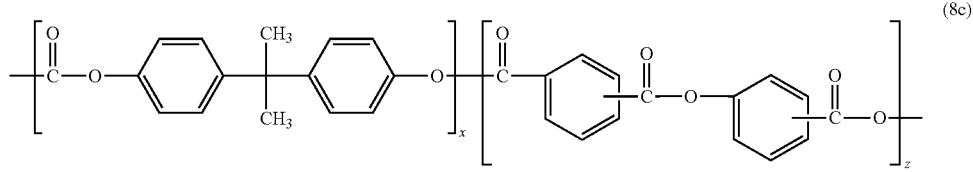

wherein the mole ratio of x:z is or from 98:2 to 2:98, or from 90:10 to 10:90. In an aspect the mole ratio of x:z is from 50:50 to 99:1, or from 1:99 to 50:50. The ITR ester units can be present in the poly(bisphenol A carbonate-co-isophtha-late-terephthalate-resorcinol ester) in an amount greater than or equal to 95 mol %, preferably greater than or equal to 99 mol %, and still more preferably greater than or equal to 99.5 mol %, based on the total moles of ester units in the copolymer. Other carbonate units, other ester units, or a combination thereof can be present, in a total amount of 1 to 20 mole%, based on the total moles of units in the copolymers, for example resorcinol carbonate units of formula (20) and bisphenol ester units of formula (7a):

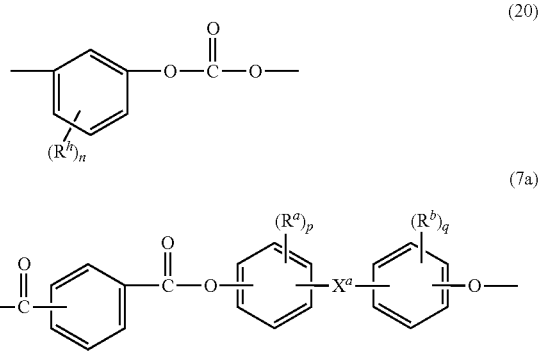

wherein, in the foregoing formulae, $R^h$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —S(O)$_2$—, —C(O)—, or a $C_{1-13}$ alkylidene of formula —C($R^c$)($R^d$)— wherein $R^c$ and $R^d$ are each independently hydrogen or $C_{1-12}$ alkyl, or a group of the formula —C(=$R^e$)— wherein $R^e$ is a divalent $C_{1-12}$ hydrocarbon group. The bisphenol ester units can be bisphenol A phthalate ester units of the formula

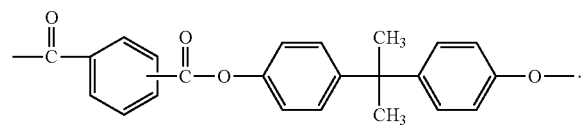

In an aspect, poly(bisphenol A carbonate-co-isophthalate-terephthalate-resorcinol ester) (8c) comprises 1 to 90 mol % of bisphenol A carbonate units, 10-99 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof. In another aspect, poly(bisphenol A carbonate-co-isophthalate-terephthalate-resorcinol ester) (8c) comprises 10 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof.

The polycarbonate copolymers comprising arylate ester units are generally prepared from polyester blocks. The polyester blocks can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination thereof, isophthaloyl dichloride, terephthaloyl dichloride, or a combination thereof can be used. The polyesters can also be obtained by melt-process condensation as described above, by solution phase condensation, or by transesterification polymerization wherein, for example, a dialkyl ester such as dimethyl terephthalate can be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester blocks, depending on the ultimate end use of the composition.

The polycarbonate copolymers comprising arylate ester units can have an $M_w$ of 2,000 to 100,000 g/mol, preferably 3,000 to 75,000 g/mol, more preferably 4,000 to 50,000 g/mol, more preferably 5,000 to 35,000 g/mol, and still more preferably 17,000 to 30,000 g/mol. Molecular weight determinations are performed using GPC using a crosslinked styrene-divinyl benzene column, at a sample concentration of 1 milligram per milliliter, and as calibrated with bisphenol A polycarbonate standards. Samples are eluted at a flow rate of 1.0 ml/min with methylene chloride as the eluent.

A specific example of a poly(ester-carbonate) is a poly (aliphatic ester-carbonate) derived from a linear $C_{6-20}$ aliphatic dicarboxylic acid (which includes a reactive derivative thereof), specifically a linear $C_{6-12}$ aliphatic dicarboxylic acid(which includes a reactive derivative thereof). Specific dicarboxylic acids include n-hexanedioic acid (adipic acid), n-decanedioic acid (sebacic acid), and alpha, omega-$C_{12}$ dicarboxylic acids such as dodecanedioic acid (DDDA). A specific poly(aliphatic ester)-polycarbonate is of formula (8):

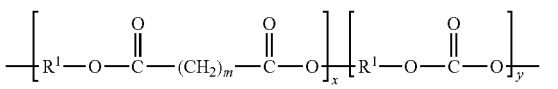

wherein each $R^1$ can be the same or different, and is as described in formula (1), m is 4 to 18, preferably 4 to 10, and the average molar ratio of ester units to carbonate units x:y is 99:1 to 1:99, including 13:87 to 2:98, or 9:91 to 2:98, or 8:92 to 2:98. In a specific aspect, the poly(aliphatic ester)-polycarbonate copolymer comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN HFD from SABIC.

The poly(aliphatic ester-carbonate) can have a weight average molecular weight of 15,000 to 45,000 g/mol (measured by GPC based on BPA polycarbonate standards). In an aspect, the poly(aliphatic ester-carbonate) has a weight average molecular weight from 18,000-30,000 grams/mole, preferably 20,000-25,000 grams/mole; or a weight average molecular weight from 30,000-45,000 grams/mole, preferably 35,000-40,000 grams/mole; or a combination thereof.

The auxiliary component can include polyesters. Useful polyesters include, for example, polyesters having repeating units of formula (7), which include poly(alkylene dicarboxylates), liquid crystalline polyesters, and polyester copolymers.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Useful polyesters can include aromatic polyesters, poly(alkylene esters) including poly(alkylene arylates), and poly(cycloalkylene diesters). Aromatic polyesters can have a polyester structure according to formula (7), wherein J and T are each aromatic groups as described above. In an aspect, useful aromatic polyesters can include poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)] ester, or a combination comprising at least one of these. Also contemplated are aromatic polyesters with a minor amount, e.g., 0.5 to 10 wt %, based on the total weight of the polyester, of units derived from an aliphatic diacid or an aliphatic polyol to make copolyesters. Poly(alkylene arylates) can have a polyester structure according to formula (7), wherein T comprises groups derived from aromatic dicarboxylates, cycloaliphatic dicarboxylic acids, or derivatives thereof. Examples of preferably useful T groups include 1,2-, 1,3-, and 1,4-phenylene; 1,4- and 1,5-naphthylenes; cis- or trans-1,4-cyclohexylene; and the like. Preferably, where T is 1,4-phenylene, the poly(alkylene arylate) is a poly(alkylene terephthalate). In addition, for poly(alkylene arylate), preferably useful alkylene groups J include, for example, ethylene, 1,4-butylene, and bis-(alkylene-disubstituted cyclohexane) including cis- or trans-1,4-(cyclohexylene)dimethylene. Examples of poly(alkylene terephthalates) include poly(ethylene terephthalate) (PET), poly(1,4-butylene terephthalate) (PBT), and poly(n-propylene terephthalate) (PPT). Also useful are poly(alkylene naphthoates), such as poly(ethylene naphthanoate) (PEN), and poly(butylene naphthanoate) (PBN). A preferably useful poly(cycloalkylene diester) is poly(1,4-cyclohexanedimethylene terephthalate) (PCT). Combinations comprising at least one of the foregoing polyesters can also be used.

Copolymers comprising alkylene terephthalate repeating ester units with other ester groups can also be useful. Preferably useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexane-dimethanol-1,4-cyclohexanedicarboxylate) (PCCD), having recurring units of formula (9)

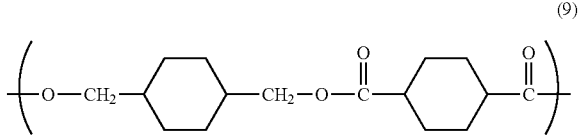

(9)

wherein, as described using formula (7), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination thereof.

The auxiliary component of the foamable polycarbonate compositions include a poly(alkylene ester), a poly(ester-carbonate), or a combination thereof and optionally, a homopoly carbonate. The auxiliary component is present from 5 to 95 wt %, or from 25 to 90 wt % or from 50 to 90 wt %, or from 70 to 90 wt %, based on the total weight of the foamable polycarbonate composition, which sums to 100%.

The foamable polycarbonate compositions further include a poly(siloxane) block copolymer, including a poly(carbonate-siloxane) (also referred to in the art as a polycarbonate-poly(siloxane) copolymer); a poly(ester-carbonate-siloxane); or a combination thereof. The poly(siloxane) blocks comprise repeating diorganosiloxane units as in formula (10)

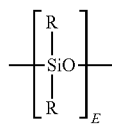

(10)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with fluorine, chlorine, bromine, or iodine, or a combination thereof. In an aspect, where a transparent poly(carbonate-siloxane) is desired, R is unsubstituted by halogen. Combinations of the foregoing R groups can be used in the same copolymer.

The value of E in formula (10) can vary widely depending on the type and relative amount of each component in the thermoplastic composition, the desired properties of the composition, and like considerations. Generally, E has an average value of 2 to 1,000, preferably 2 to 500, 2 to 200, or 2 to 125, 5 to 80, or 10 to 70. In an aspect, E has an average value of 10 to 80 or 10 to 40, and in still another aspect, E has an average value of 40 to 80, or 40 to 70. Where E is of a lower value, e.g., less than 40, it can be desirable to use a relatively larger amount of the poly (carbonate-siloxane) copolymer. Conversely, where E is of a higher value, e.g., greater than 40, a relatively lower amount of the poly(carbonate-siloxane) copolymer can be used. A combination of a first and a second (or more) poly(carbonate-siloxane) copolymers can be used, wherein the average value of E of the first copolymer is less than the average value of E of the second copolymer.

In an aspect, the poly(siloxane) blocks are of formula (11)

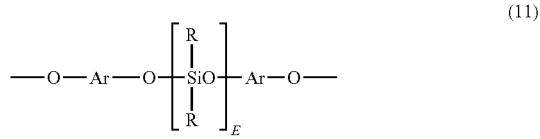

(11)

wherein E and R are as defined if formula (10); each R can be the same or different, and is as defined above; and Ar can be the same or different, and is a substituted or unsubstituted $C_{6-30}$ arylene, wherein the bonds are directly connected to an aromatic moiety. Ar groups in formula (11) can be derived from a $C_{6-30}$ dihydroxyarylene compound, for example a dihydroxyarylene compound of formula (3) or (6). Dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane.

In another aspect, poly(siloxane) blocks are of formula (13)

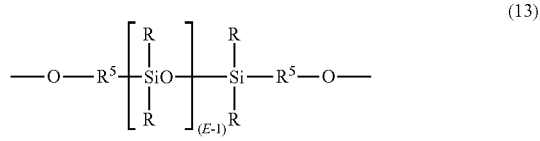

(13)

wherein R and E are as described above, and each $R^5$ is independently a divalent $C_{1-30}$ organic group, and wherein the polymerized poly(siloxane) unit is the reaction residue of its corresponding dihydroxy compound. In a specific aspect, the poly(siloxane) blocks are of formula (14):

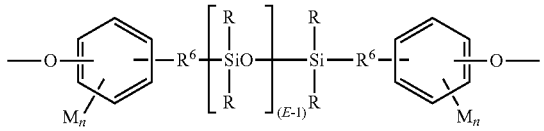

(14)

wherein R and E are as defined above. $R^6$ in formula (14) is a divalent $C_{2-8}$ aliphatic group. Each M in formula (14) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4.

In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another aspect, R is methyl, or a combination of methyl and trifluoropropyl, or a combination of methyl and phenyl. In still another aspect, R is methyl, M is methoxy, n is one, and $R^6$ is a divalent $C_{1-3}$ aliphatic group. Specific poly(siloxane) blocks are of the formula

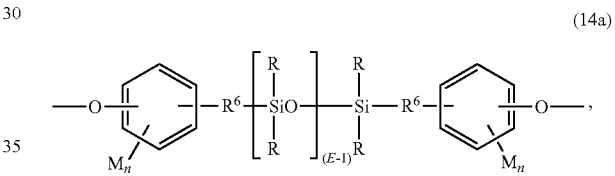

(14a)

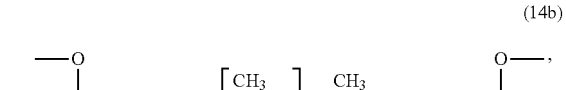

(14b)

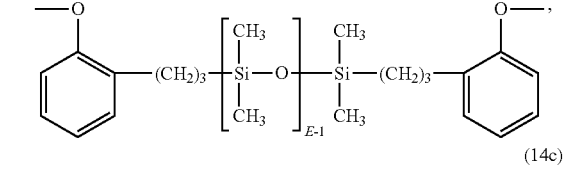

(14c)

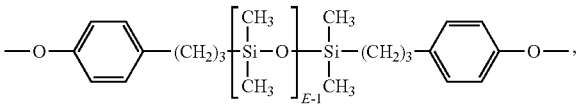

or a combination thereof, wherein E has an average value of 2 to 200, 2 to 125, 5 to 125, 5 to 100, 5 to 50, 20 to 80, or 5 to 20.

Blocks of formula (14) can be derived from the corresponding dihydroxy poly(siloxane), which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The poly(carbonate-siloxane) copolymers can then be manufactured, for example, by the synthetic procedure of European Patent Application Publication No. 0 524 731 A1 of Hoover, page 5, Preparation 2.

The poly(carbonate-siloxane) copolymers can comprise 50 to 99 wt % of carbonate units and 1 to 50 wt % siloxane units. Within this range, the poly(carbonate-siloxane) copolymer can comprise 70 to 98 wt %, more preferably 75 to 97 wt % of carbonate units and 2 to 30 wt %, more preferably 3 to 25 wt % siloxane units.

In an aspect, a blend is used, in particular a blend of a bisphenol A homopolycarbonate and a poly(carbonate-siloxane) block copolymer of bisphenol A blocks and eugenol capped polydimethylsiloxane blocks, of formula (15)

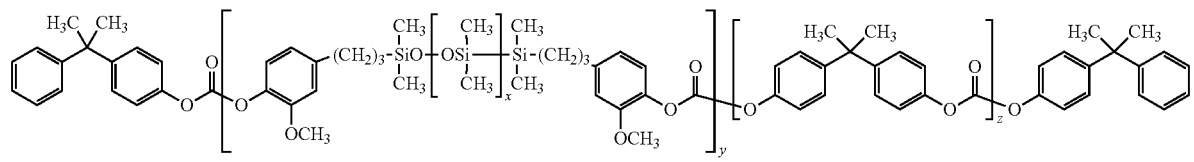

wherein x is 1 to 200, preferably 5 to 85, preferably 10 to 70, preferably 15 to 65, and more preferably 40 to 60; y is 1 to 500, or 10 to 200, and z is 1 to 1000, or 10 to 800. In an aspect, x is 1 to 200, y is 1 to 90 and z is 1 to 600, and in another aspect, x is 30 to 50, y is 10 to 30 and z is 45 to 600. The poly(siloxane) blocks can be randomly distributed or controlled distributed among the polycarbonate blocks.

In an aspect, the poly(carbonate-siloxane) copolymer comprises 10 wt % or less, preferably 6 wt % or less, and more preferably 4 wt % or less, of the poly(siloxane) based on the total weight of the poly(carbonate-siloxane) copolymer and are generally optically transparent and are commercially available under the name EXL-T from SABIC. In another aspect, the poly(carbonate-siloxane) copolymer comprises 10 wt % or more, preferably 12 wt % or more, and more preferably 14 wt % or more, of the poly(siloxane) copolymer based on the total weight of the poly(carbonate-siloxane) copolymer, are generally optically opaque and are commercially available under the trade name EXL-P from SABIC.

The poly(carbonate-siloxane)s are present from 5 to 95 wt %, or from 10 to 75 wt % or from 10 to 50 wt %, or from 10 to 30 wt %, based on the total weight of the foamable polycarbonate composition, which sums to 100%.

Poly(carbonate-siloxane)s can have a weight average molecular weight of 2,000 to 100,000 g/mol, preferably 5,000 to 50,000 g/mol as measured by gel permeation chromatography using a crosslinked styrene-divinyl benzene column, at a sample concentration of 1 milligram per milliliter, and as calibrated with polycarbonate standards. In an aspect, the poly(carbonate siloxane) has a weight average molecular weight of 20,000 to 45,000 g/mol, or 20,000 to 35,000, as measured by gel permeation chromatography using a crosslinked styrene-divinyl benzene column, at a sample concentration of 1 milligram per milliliter, and as calibrated with poly carbonate standards.

The foamable polycarbonate composition can include various additives ordinarily incorporated into polymer compositions of this type, with the proviso that the additive(s) are selected so as to not significantly adversely affect the desired properties of the thermoplastic composition, in particular processing temperature or glass transition temperature. Such additives can be mixed at a suitable time during the mixing of the components for forming the composition. Additives include impact modifiers, fillers, reinforcing agents, antioxidants, heat stabilizers, light stabilizers, ultraviolet (UV) light stabilizers, lubricants, mold release agents, antistatic agents, colorants such as such as titanium dioxide, carbon black, and organic dyes, surface effect additives, radiation stabilizers, a flame retardant, and anti-drip agents. In an aspect, a combination of additives can be used. For example, the total amount of the additives can be up to 10 wt %, or 0.01 to 10 wt %, or 0.01 to 5 wt %, or 0.1 to 1 wt %, based on the total weight of the foamable polycarbonate composition.

A foamed sample of the foamable polycarbonate composition can have a density of 100 to 1000 kg/m³ determined according to ASTM D1622-08 using the so-called geometric method. As applied, the weight of a minimum of 10 samples (3 cm×3 cm) is divided by the corresponding volume.

A foamed sample of the foamable polycarbonate composition can have an open cell content determined with a gas pycnometer according to ASTM D6226 of 0 to 100%.

A foamed sample of the foamable polycarbonate composition can have a glass transition temperature determined by differential scanning calorimetry of up to 140° C., from 50 to 140° C., or from 100 to 140° C.

A foamed sample of the foamable polycarbonate composition can have a nucleation density of $1\times10^5$ to $1\times10^{16}$, or $1\times10^{12}$ to $1\times10^{16}$ cells/cm³.

A foamed sample of the foamable polycarbonate composition can have an average cell size of 5 nanometers (nm) to 20 micrometers (μm), 5 nm to 10 μm, 5 nm to 5 μm, 5 nm to 1000 nm, 5 nm to 800 nm, 5 nm to 600 nm, 5 nm to 400 nm, or 5 to 200 nm, or 5 nm to 100 nm.

A method of forming an article from the foamable polycarbonate compositions includes the use of a blowing agent. The blowing agent is preferably soluble in the foamable composition. As used herein, the term "blowing agent" is defined as a chemical agent or a physical agent that is used to foam the foamable polycarbonate composition. The blowing agent can be a gas, a solid, a liquid, or a supercritical blowing agent. A blowing agent is used to form a foamed article from the foamable polycarbonate composition. Blowing agents that may be used include inorganic agents, organic agents, or chemical agents. Organic agents include $C_{1-9}$ aliphatic hydrocarbons, $C_{1-3}$ aliphatic alcohols s, and $C_{1-4}$ halohydrocarbons. Useful blowing agents for preparing foamed articles from the foamable polycarbonate compositions include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis(benzenesulfonylhydrazide), sodium bicarbonate, ammonium carbonate, or the like, or a combination thereof. In an aspect, the blowing agent includes solid carbon dioxide, liquid carbon dioxide, gaseous carbon dioxide, or supercritical carbon dioxide. In an aspect, the blowing agent includes an inert gas, such as helium, xenon, argon, or a combination thereof. In another aspect, the blowing agent includes methane, ethane, propane, butane, or a combination thereof. Halohydrocarbons that would be expected to be in gaseous form at ambient temperature and pressure can be used, for example, fluorohydrocarbons, fluorocarbons, chlorocarbons, or chlorofluorocarbons. Blowing agents are generally used in amounts of 0.1 to 10 wt %, based on 100 wt % of the composition.

The foam can be manufactured by several methods. Batch methods and continuous methods can be used. In an exemplary aspect, in a batch process, the foamable polycarbonate composition is first immersed in a fluid blowing agent under pressure for a period of time to form a fluid blowing agent-saturated-composition. The fluid blowing agent can be any fluid blowing agent that is soluble in the foamable polycarbonate composition and which upon the removal of pressure can undergo nucleation and growth to form the foam. Examples of suitable fluid blowing agents are carbon dioxide, nitrogen, chlorofluorocarbons, and the like. An exemplary fluid blowing agent is carbon dioxide. The carbon dioxide can be in gaseous, liquid, or supercritical form.

The temperature of the foamable polycarbonate composition now saturated with the fluid blowing agent is then elevated to produce a foam. During the elevation of the temperature of the block of the foamable polycarbonate composition, the pressure may be reduced if desired. The size of the pores can be controlled by quenching the foam in a cooler fluid blowing agent if desired.

Pressure may be applied to facilitate the diffusion of the fluid blowing agent (e.g., carbon dioxide) into the foamable polycarbonate composition to form the carbon dioxide-saturated foamable polycarbonate composition. The pressure may be applied for a time effective to saturate the foamable polycarbonate composition with the fluid blowing agent. The pressure used to facilitate the immersion of carbon dioxide into the foamable polycarbonate composition is greater than or equal to 0.1 Newtons per square millimeter ($N/mm^2$), preferably greater than or equal to 1 $N/mm^2$, more preferably greater than or equal to 6 $N/mm^2$, and more preferably greater than or equal to 10 $N/mm^2$. For example, a pressure of 10 to 15 $N/mm^2$ may be used to facilitate the diffusion. The temperature may be maintained to further facilitate the diffusion. A temperature of $-140°$ C. to $500°$ C. can be applied, preferably $-70°$ C. to $200°$ C., more preferably $-60°$ C. to $100°$ C. An exemplary temperature for diffusion is $22°$ C.

Following the saturation of foamable polycarbonate composition, the pressure may be reduced and the temperature is increased. The increasing in temperature can be conducted and controlled in an oil bath. The temperature is generally increased to a temperature that is greater than the glass transition temperature of the foamable polycarbonate composition. An exemplary temperature for the oil bath is 40 to $600°$ C., or 75 to $220°$ C., or 100 to $190°$ C., or 110 to $155°$ C.

The foam may optionally be quenched in a bath in order to control the pore sizes. The bath may contain water, liquid carbon dioxide, liquid nitrogen, dry ice, dry ice mixed with organic solvents, or the like. The bath is maintained at a temperature that is below the glass transition temperature of the foamable poly carbonate composition. An exemplary temperature for the bath is $-40°$ C. to $200°$ C.

In another aspect, the foam can be manufactured in a continuous process. In an exemplary continuous process, the foamable polycarbonate composition is fed into a device that can apply shear force, extensional force, compressive force, ultrasonic energy, electromagnetic energy, or thermal energy to the foamable polycarbonate composition. During the application of these forces and forms of energy to the foamable polycarbonate composition, it reaches a temperature above its flow point. The fluid blowing agent (that is soluble in the foamable polycarbonate composition) is also introduced into the device and dissolves in the foamable polycarbonate composition under pressure to form the fluid blowing agent saturated—the foamable polycarbonate composition. Upon being ejected from the device, the fluid blowing agent undergoes nucleation and growth in the foamable polycarbonate composition to produce a foam.

Melt blending of the foamable polycarbonate composition involves the use of shear force, extensional force, compressive force, ultrasonic energy, electromagnetic energy, thermal energy or combinations thereof, and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations thereof.

Melt blending involving the aforementioned forces may be conducted in machines such as single or multiple screw extruders, Buss kneaders, Henschel mixers, helicones, Ross mixers, Banbury, roll mills, molding machines such as injection molding machines, vacuum forming machines, blow molding machines, or the like, or a combination thereof.

In an aspect, the melt blending is conducted in an extruder. In another aspect, the melt blending is conducted in the single or twin-screw extruder of an injection-molding machine.

The pressure used to facilitate the immersion of carbon dioxide into the foamable polycarbonate composition is greater than or equal to 0.1 ($N/mm^2$), preferably greater than or equal to 1 $N/mm^2$, more preferably greater than or equal to 6 $N/mm^2$, more preferably greater than or equal to 10 $N/mm^2$, more preferably greater than or equal to 100 $N/mm^2$. A pressure of 10 to 15 $N/mm^2$ may be used. During the application of pressure to facilitate the immersion of the carbon dioxide into the foamable polycarbonate composition, the temperature of the foamable polycarbonate composition may be optionally elevated. In one aspect, the immersion of the carbon dioxide into the foamable polycarbonate composition can be conducted from room temperature to $300°$ C., or from 50 to $250°$ C. and or from 100 to $200°$ C.

As noted above, the pore sizes can be controlled by quenching the foam during expansion. Then quenching is generally conducted in a bath maintained at a temperature that is less than the glass transition temperature of the foamable polycarbonate composition. When the melt blending is conducted in an extruder, the extrudate is quenched in a bath that has a temperature less than or equal to the glass transition temperature of the foamable polycarbonate composition. When the melt blending is conducted in an injection-molding machine, the mold may be set to a temperature that is less than or equal to the glass transition temperature of the foamable polycarbonate composition. In an aspect, quenching can also occur due to the evaporation of carbon dioxide, for example.

Foam articles comprising the foamable polycarbonate compositions are also provided. The foams manufactured by the methods disclosed herein can be used in a variety of different articles. The articles can include thermal insulation, acoustic barriers, filters, membranes for permeability, and the like.

The foamable polycarbonate compositions are further illustrated by the following non-limiting examples.

EXAMPLES

The following components are used in the examples. Unless specifically indicated otherwise, the amount of each component is in wt %, based on the total weight of the composition.

The materials shown in Table 1 were used.

TABLE 1

| Component | Description (Trade name) | Source |
|---|---|---|
| PC-Si-1 (t-EXL) | Poly(bisphenol A carbonate-dimethylsiloxane) copolymer produced via interfacial polymerization, 6 wt % siloxane, average siloxane block length = 45 units (D45), Mw = 21,000-24,000 g/mol as per GPC using polycarbonate standards. | SABIC |
| PC-1 | Poly(bisphenol A carbonate); produced by interfacial polymerization; Mw = 20,000-22,000 g/mol determined via GPC using BPA homopolycarbonate standards. | SABIC |
| PC-2 | Poly(bisphenol A carbonate) produced by interfacial polymerization; Mw = 30,000-31,000 g/mol determined via GPC using BPA homopolycarbonate standards. | SABIC |
| HFD-1 | Sebacic acid-bisphenol A copolymer, 8.5 mol % sebacic acid, PDI = 2.7, biocontent = 6.0%, p-cumylphenol endcap, MFR = 6.5 g/10 min based on ASTM D1238, Mw = 35,000-37,000, determined via GPC using BPA homopolycarbonate standards | SABIC |
| HFD-2 | Sebacic acid-bisphenol A copolymer, 6.0 mol % sebacic acid, PDI = 2.6, biocontent = 5.0%, p-cumylphenol endcap, MFR = 45 g/10 min based on ASTM D1238, Mw = 20,000 to 21,000 determined via GPC using BPA homopolycarbonate standards | SABIC |
| PCCD | Poly(1,4-cyclohexane-dimethanol-1,4-cyclohexanedicarboxylate) | Eastman |
| AO | Tris(2,4-di-tert-butylphenyl)phosphite, available as IRGAFOS 168 | Ciba |

All foamable compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently molded according to ISO 294 on a Husky or BOY injection-molding machine. Compositions are compounded and molded at a temperature of 285 to 330° C., though it will be recognized by one skilled in the art that the method cannot be limited to these temperatures.

The foam can be manufactured by several methods. Batch methods and continuous methods can be used. In one exemplary aspect, in a batch process, the foamable polycarbonate composition is first immersed in a fluid blowing agent under pressure for a period of time to form a fluid blowing agent-saturated-composition. The fluid blowing agent can be any fluid blowing agent that is soluble in the foamable polycarbonate composition and which upon the removal of pressure can undergo nucleation and growth to form the foam. Examples of suitable fluid blowing agents are carbon dioxide, nitrogen, chlorofluorocarbons, and the like. An exemplary fluid blowing agent is carbon dioxide. The carbon dioxide can be in gaseous, liquid, or supercritical form.

Nucleation density can be determined by image analysis (determining the number of cells per volume unit) of a microscopy image.

An average cell size of the polymer foams described herein can be determined by cryo-fracturing a foam part to generate a sample. To illustrate, a foam is quickly frozen with liquid nitrogen and broken with a sharp blow to generate the smaller samples. A representative portion (e.g., an area having dimensions between 2 μm×2 μm and 10 μm×10 μm) of a cross-section of the sample is analyzed by an electron microscope (e.g., a scanning electron microscope (SEM)) to determine a maximum transverse dimension and a minimum transverse dimension for a number of random cells (e.g., 50-200) of the sample.

Examples 1-4

The formulations Examples 1-4 are shown in Table 2.

TABLE 2

| Component/Property | Unit | Ex. 1 | Ex. 2 | Comp. Ex. 3 |
|---|---|---|---|---|
| PC-Si-1 (EXL-t) | wt % | 20.0 | 20.0 | 20.0 |
| PC-1 | wt % | | 44.94 | 69.94 |
| PC-2 | wt % | | 10.0 | 10.0 |
| HFD-1 | wt % | 10.0 | | |
| HFD-2 | wt % | 69.94 | | |
| PCCD | wt % | | 25.0 | |
| AO | wt % | 0.06 | 0.06 | 0.06 |
| Tg | ° C. | 136.5 | 124.9 | 146.3 |
| Siloxane content | wt % | 1.2 | 1.2 | 1.2 |

Examples 1-2 and Comparative Example 3 included 20 wt % poly(carbonate-siloxane) (PC-Si) and an auxiliary polycarbonate. When the auxiliary polycarbonate was a mixture of poly(sebacic ester-bisphenol A carbonate)s HFD-1 and HFD-2 as in Example 1, or a mixture of poly(1,4-cyclohexane-dimethanol-1,4-cyclohexanedicarboxylate) (PCCD) and BPA-homopolycarbonates PC-1 and PC-2) as in Example 2, the compositions had glass transition temperatures (Tg) of 136.5° C. and 124.9° C., respectively. However, as shown in Comparative Example 3, when the foamable composition included only the BPA-homopolycarbonates, the Tg undesirably exceeded 140° C. (i.e., 146.3° C.).

This disclosure further encompasses the following aspects.

Aspect 1: A foamable polycarbonate composition comprising 5 to 95 wt % of a poly(siloxane) block copolymer comprising a poly(carbonate-siloxane) comprising 50 to 99 wt % of bisphenol A carbonate units and 1 to 50 wt % of dimethylsiloxane units, each based on the weight of the poly(carbonate-siloxane), a poly(ester-carbonate-siloxane) comprising bisphenol A carbonate units, isophthalate-terephthalate-bisphenol A ester units, and 5 to 200 dimethyl siloxane units, or a combination thereof; 5 to 95 wt % of an auxiliary component comprising a poly(alkylene ester), a poly(ester-carbonate), or a combination thereof and optionally, a homopolycarbonate; optionally, up to 10 wt % of an additive composition, wherein the composition has a glass transition temperature of 140° C. and below measured using differential scanning calorimetry, and wherein a foamed sample of the composition has an average cell size of 10 nanometers to 20 micrometers.

Aspect 2: The foamable polycarbonate composition of any one of the preceding aspects, wherein the poly(carbonate-siloxane) copolymer comprises 70 to 98 wt %, more preferably 75 to 97 wt % of carbonate units and 2 to 30 wt %, more preferably 3 to 25 wt % siloxane units, and wherein the poly(carbonate-siloxane) comprises siloxane units of formulas 14a, 14b, 14c, or a combination thereof, wherein E has an average value of 2-200, 5-100, 5-50, 20-80, or 5-20, $R^6$ is a divalent $C_{1-8}$ aliphatic group, each instance of M in formula is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, and n is independently 0, 1, 2, 3, or 4.

Aspect 3: The foamable polycarbonate composition according to any one of the preceding aspects, wherein the poly(carbonate-siloxane) is of formula 15 wherein x is 1 to 200, preferably 5 to 85, preferably 10 to 70, preferably 15 to 65, and more preferably 40 to 60; y is 1 to 500, or 10 to 200, and z is 1 to 1000, or 10 to 800.

Aspect 4: The foamable polycarbonate composition according to any one of the preceding aspects, wherein the homopolycarbonate comprises a bisphenol A homopolycarbonate having a weight average molecular weight from 18,000-35,000 grams/mole, preferably 20,000-25,000 grams/mole; or a bisphenol A homopolycarbonate having a weight average molecular weight from 25,000-35,000 grams/mole, preferably 27,000-32,000 grams/mole; or a combination thereof, each as measured via gel permeation chromatography using bisphenol A homopolycarbonate standards.

Aspect 5: The foamable polycarbonate composition of any one of the preceding aspects, wherein the poly(aliphatic ester-carbonate) comprises bisphenol A carbonate units and aliphatic ester units derived from a $C_{8-12}$ aliphatic dicarboxylic acid and bisphenol A, preferably derived from sebacic acid and bisphenol A, wherein the poly(aliphatic ester-carbonate) has a weight average molecular weight from 15,000 to 45,000 grams/mole as measured via gel permeation chromatography using bisphenol A homopolycarbonate standards.

Aspect 6: The foamable polycarbonate composition of any one of the preceding aspects, wherein the poly(aliphatic ester-carbonate) has a poly(aliphatic ester-carbonate) having a weight average molecular weight from 18,000-30,000 grams/mole, preferably 20,000-25,000 grams/mole; or a poly(aliphatic ester-carbonate) having a weight average molecular weight from 30,000-45,000 grams/mole, preferably 35,000-40,000 grams/mole; or a combination thereof, each as measured via gel permeation chromatography using bisphenol A homopolycarbonate standards.

Aspect 7: The foamable polycarbonate composition of any one of the preceding aspects, wherein the poly(alkylene ester) comprises a poly(cycloalkylene diester), preferably a poly(alkylene cyclohexanedicarboxylate), more preferably poly(1,4-cyclohexane-dimethanol-1,4-cyclohexanedicarboxylate).

Aspect 8: The foamable polycarbonate composition of any one of the preceding aspects, wherein the additive composition is present and comprises an impact modifier, a flow modifier, an antioxidant, a heat stabilizer, a light stabilizer, an ultraviolet light stabilizer, an ultraviolet absorbing additive, an antistatic agent, an anti-fog agent, an antimicrobial agent, a colorant, a surface effect additive, a radiation stabilizer, a flame retardant, or a combination thereof.

Aspect 9: The foamable polycarbonate composition of any one of the preceding aspects comprising 10 to 30 wt % of the poly(carbonate-siloxane) as the poly(siloxane) block copolymer; and 70 to 90 wt % of poly(aliphatic ester-carbonate) as the auxiliary component.

Aspect 10: The foamable polycarbonate composition of any one of the preceding aspects comprising 10 to 30 wt % of the poly(carbonate-siloxane) as the poly(siloxane) block copolymer; and 70 to 90 wt % of the bisphenol homopolycarbonate as the auxiliary component.

Aspect 11: The foamable polycarbonate composition of any one of the preceding aspects, wherein a siloxane content of the foamable composition is 0.001 to 40 wt %, or 0.001 to 6 wt %, or 0.1 to 6 wt %, or 0.2 to 6 wt %, or 3 to 40 wt %, or 10 to 40 wt %, or 20 to 40 wt %, based on the total weight of the foamable polycarbonate composition.

Aspect 12: The foamable polycarbonate composition of any one of the preceding aspects, wherein the foamed sample has an average cell size of 5 to 1000 nanometers, or 5 to 800 nanometers, or 5 to 600 nanometers, or 5 to 400 nanometers, or 5 to 200 nanometers, or 5 to 100 nanometers.

Aspect 13: An article made from the foamable polycarbonate composition of any one of the preceding aspects.

Aspect 14: A method for forming the article of Aspect 13, comprising immersing the foamable polycarbonate composition in a blowing agent to form a saturated foam composition; increasing the temperature of the fluid blowing agent saturated foamable polycarbonate composition to no greater than 130° C.; and foaming the foamable polycarbonate composition to form a foamed article that has an average cell size of 5 nanometers to 20 micrometers.

Aspect 15: The method for forming the article of Aspect 14, wherein the foaming comprises a solid state foaming process, an extrusion foaming process, a bead foaming process, or a foam injection molding process.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_2$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl)a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A foamed polycarbonate composition comprising
   5 to 95 wt % of a poly(siloxane) block copolymer comprising
   a poly(carbonate-siloxane) comprising 90 to 99 wt % of bisphenol A carbonate units and 1 to 10 wt % of dimethylsiloxane units, each based on the weight of the poly(carbonate-siloxane),
   a poly(ester-carbonate-siloxane) comprising bisphenol A carbonate units, isophthalate-terephthalate-bisphenol A ester units, and 5 to 200 dimethyl siloxane units,
   or a combination thereof;
   5 to 95 wt % of an auxiliary component comprising
   a poly(alkylene ester),
   a poly(aliphatic ester-carbonate) comprising bisphenol A carbonate units and aliphatic ester units derived from a C$_{8-12}$ aliphatic dicarboxylic acid and bisphenol A, wherein the poly(aliphatic ester-carbonate) has a weight average molecular weight from 15,000 to 45,000 grams/mole as measured via gel permeation chromatography using bisphenol A homopolycarbonate standards,
   or a combination thereof, and
   optionally, a homopolycarbonate;
   optionally, up to 10 wt % of an additive composition comprising a flow modifier, an antioxidant, a heat stabilizer, a light stabilizer, an ultraviolet light stabilizer, an ultraviolet absorbing additive, a lubricant, a mold release agent, an antistatic agent, an anti-fog agent, an antimicrobial agent, a colorant, a surface effect additive, a radiation stabilizer, a flame retardant, an anti-drip agent, or a combination thereof,
   wherein the siloxane content of the foamed composition is 0.001 to 3 wt %,
   wherein the composition has a glass transition temperature of 140° C. and below measured using differential scanning calorimetry, and wherein the poly(siloxane) block copolymer, the auxiliary component, and the optional additive composition total 100 wt %, and wherein the polycarbonate composition does not comprise an impact modifier, a filler, or a reinforcing agent.

2. The foamed polycarbonate composition of claim 1, wherein the poly(carbonate-siloxane) copolymer comprises siloxane units of the formula

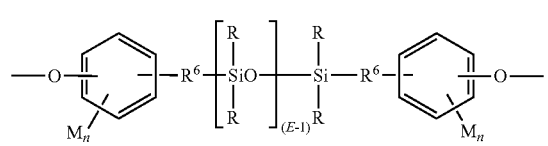

-continued

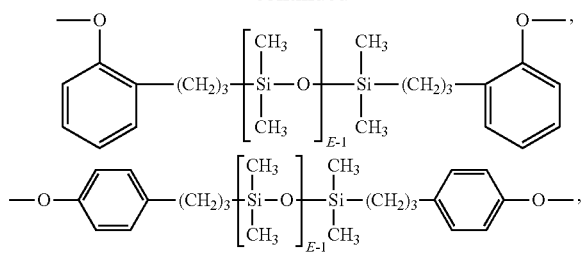

or a combination thereof,
wherein:
E has an average value of 2-200, 5-100, 5-50, 20-80, or 5-20, $R6$ is a divalent $C1\_8$ aliphatic group,
each instance of M in formula is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, and
n is independently 0, 1, 2, 3, or 4.

3. The foamed polycarbonate composition of claim 1, wherein the poly(carbonate-siloxane) has a formula or a combination thereof,
each as measured via gel permeation chromatography using bisphenol A homopolycarbonate standards.

6. The foamed polycarbonate composition of claim 1, wherein the poly(alkylene ester) comprises a poly(cycloalkylene diester).

7. The foamed polycarbonate composition of claim 1, wherein the additive composition is present.

8. The foamed polycarbonate composition of Claim1 comprising
10 to 30 wt % of the poly(carbonate-siloxane) as the poly(siloxane) block copolymer; and
70 to 90 wt % of poly(aliphatic ester-carbonate) as the auxiliary component.

9. The foamed polycarbonate composition of claim 1 comprising
10 to 30 wt % of the poly(carbonate-siloxane) as the poly(siloxane) block copolymer; and
70 to 90 wt % of bisphenol homopolycarbonate and poly(cycloalkylene diester) as the auxiliary component.

10. An article made from the foamed polycarbonate composition of claim 1.

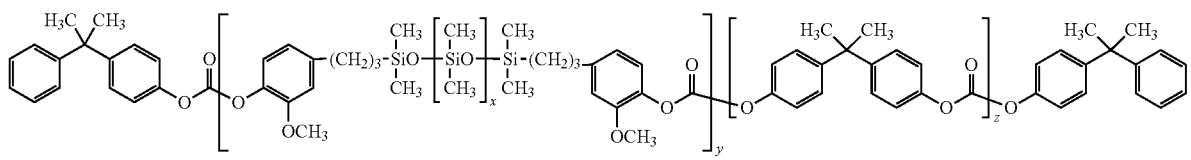

wherein
x is 1 to 200;
y is 1 to 500, or 10 to 200, and
z is 1 to 1000, or 10 to 800.

4. The foamed polycarbonate composition of claim 1, wherein the homopolycarbonate is present and comprises
a bisphenol A homopolycarbonate having a weight average molecular weight from 18,000-35,000 grams/mole; or
a bisphenol A homopolycarbonate having a weight average molecular weight from 25,000-35,000 grams/mole; or a combination thereof,
each as measured via gel permeation chromatography using bisphenol A homopolycarbonate standards.

5. The foamed polycarbonate composition of claim 1, wherein the poly(ester-carbonate) is a poly(aliphatic ester-carbonate) having
a poly(aliphatic ester-carbonate) having a weight average molecular weight from 18,000-30,000 grams/mole; or
a poly(aliphatic ester-carbonate) having a weight average molecular weight from 30,000-45,000 grams/mole;

11. A method for forming the article of claim 10, comprising
immersing a mixture of the poly(siloxane) block copolymer, the auxiliary component, and the optional additive composition in a blowing agent to form a saturated foamed composition;
increasing the temperature of the saturated foamed polycarbonate composition to no greater than 130° C.

12. The method for forming the article of claim 11, wherein foaming comprises a solid state foaming process, an extrusion foaming process, a bead foaming process, or a foam injection molding process.

13. The foamed composition of claim 1, wherein the foamed composition has an average cell size of 10 nanometers to 20 micrometers.

14. The foamed composition of claim 13, wherein the foamed composition has an average cell size of 10 to 1000 nanometers.

15. The foamed composition of claim 13, wherein the foamed composition has an average cell size of 10 to 200 nanometers.

16. The foamed composition of claim 13, wherein the foamed composition has an average cell size of 10 to 100 nanometers.

* * * * *